United States Patent
Whatmough et al.

(10) Patent No.: US 9,960,904 B2
(45) Date of Patent: May 1, 2018

(54) CORRELATION DETERMINATION EARLY TERMINATION

(71) Applicant: ARM LIMITED, Cambridge (GB)

(72) Inventors: Paul Nicholas Whatmough, Cambridge (GB); Jeremy Constantin, Cambridge (GB)

(73) Assignee: ARM Limited, Cambridge (GB)

( * ) Notice: Subject to any disclaimer, the term of this patent is extended or adjusted under 35 U.S.C. 154(b) by 0 days. days.

(21) Appl. No.: 15/324,841

(22) PCT Filed: Jun. 3, 2015

(86) PCT No.: PCT/GB2015/051619
§ 371 (c)(1),
(2) Date: Jan. 9, 2017

(87) PCT Pub. No.: WO2016/012746
PCT Pub. Date: Jan. 28, 2016

(65) Prior Publication Data
US 2017/0207909 A1    Jul. 20, 2017

(30) Foreign Application Priority Data
Jul. 24, 2014    (GB) .................................. 1413134.6

(51) Int. Cl.
H04L 7/04    (2006.01)
H04L 7/00    (2006.01)
H04W 52/02    (2009.01)

(52) U.S. Cl.
CPC ............ *H04L 7/042* (2013.01); *H04L 7/0087* (2013.01); *H04W 52/0229* (2013.01)

(58) Field of Classification Search
CPC ... H04L 7/042; H04L 7/0087; H04W 52/0229
See application file for complete search history.

(56) References Cited

U.S. PATENT DOCUMENTS 5,889,768 A    3/1999  Storm et al.
6,628,606 B1 *    9/2003  Hong .................. H04L 27/2659
                                                     370/208
(Continued)

FOREIGN PATENT DOCUMENTS

EP    1 098 450    5/2001
EP    1 128 565    8/2001
(Continued)

OTHER PUBLICATIONS

International Search Report and Written Opinion of the ISA for PCT/GB2015/051619, dated Sep. 18, 2015, 11 pages.
Search Report for GB 1413134.6, dated Jan. 26, 2015, 4 pages.

*Primary Examiner* — Janice Tieu
(74) *Attorney, Agent, or Firm* — Nixon & Vanderhye P.C.

(57) ABSTRACT

Correlation circuitry includes selection circuitry for selecting a sequence of symbol subsets comprising proper subsets of a candidate sequence of symbols and corresponding proper subsets of a target sequence of symbols. Correlation value determining circuitry determines partial correlation values for these proper subsets which are then combined by correlation value combining circuitry to generate a current combined correlation value. Early termination circuitry compares the current combined correlation value with an early termination condition represented by a threshold value to determine whether or not early termination of the correlation determination may be performed. Early termination may be performed when the combined correlation value indicates a sufficient degree of confidence in the partial result determined such that continuing with determination of the full correlation is not justified.

21 Claims, 3 Drawing Sheets

(56) References Cited

U.S. PATENT DOCUMENTS

| | | |
|---|---|---|
| 2003/0112850 A1 | 6/2003 | Shmazaki |
| 2004/0179625 A1* | 9/2004 | Kim .................... H04L 27/2659 375/260 |
| 2005/0169408 A1* | 8/2005 | Kim .................... H04L 27/2675 375/343 |
| 2007/0014335 A1 | 1/2007 | Callaway et al. |
| 2008/0246881 A1* | 10/2008 | Kim ..................... H04L 1/0047 348/607 |

FOREIGN PATENT DOCUMENTS

| | | |
|---|---|---|
| WO | WO 99/08414 | 2/1999 |
| WO | WO 01/45290 | 6/2001 |
| WO | WO 2004/100423 | 11/2004 |

\* cited by examiner

CORRELATION DETERMINATION EARLY TERMINATION

CROSS-REFERENCE TO RELATED APPLICATIONS

This application is the U.S. national phase of International Application No. PCT/GB2015/051619 filed 3 Jun. 2015 which designated the U.S. and claims priority to GB Patent Application No. 1413134.6 filed 24 Jul. 2014, the entire contents of each of which are hereby incorporated by reference.

BACKGROUND

This disclosure relates to the field of data processing systems. More particularly, this disclosure relates to the determination of correlation between a candidate sequence of symbols and a target sequence of symbols.

It is known to provide correlation circuitry which operates to determine a correlation between a candidate sequence of symbols and a target sequence of symbols. Such correlators typically use N parallel multiply-add structures and an N-sample shift register, where N is the length of the target sequence of symbols. The output of the correlator varies as the candidate sequence of symbols is clocked into the shift register. A thresholding comparator is used to compare the output of the N parallel multiply-add structures with a threshold value to determine the presence or absence of the target sequence of symbols.

An example use of such a correlator is in a "wakeup" receiver. A wakeup receiver is a continuously active hardware block that seeks to detect the presence of a known radio signal from another device. Once this signal is detected, the wakeup receiver triggers a larger system to power up and take some further action. The presence of a known radio signal may be detected by detecting the presence of a target sequence of symbols within a received radio signal. As the wakeup receiver is continuously powered, it is desirable that its power consumption below. At the same time, it is desirable that the wakeup receiver should not generate a large number of false positive detections as the power consumed by inappropriately waking up the full system is high.

It will be appreciated that providing low power correlation has a particular advantage in the context of a wakeup receiver, more generally a low power correlator may be used elsewhere with advantage.

SUMMARY

At least some example embodiments of the present disclosure provide correlation circuitry comprising:

selection circuitry configured to select a sequence of symbol subsets comprising proper subsets of a candidate sequence of symbols and corresponding proper subsets of a target sequence of symbols;

correlation value determining circuitry coupled to said selection circuitry and configured to determine for a given symbol subset of said sequence of symbol subsets comprising a given proper subset of said candidate sequence of symbols and a given proper subset of said target sequence of symbols a partial correlation value indicative of correlation between said given proper subset of said candidate sequence of symbols and said given proper subset of said target sequence of symbols;

correlation value combining circuitry coupled to said correlation value determining circuitry and configured to generate a combined correlation value by combining said partial correlation value with one or more previously determined partial correlation values indicative of correlations between different proper subsets of said candidate sequence of symbols and corresponding different proper subsets of said target sequence of symbols; and early termination circuitry coupled to said correlation value combining circuitry and configured:
  (i) if said combined correlation value meets an early termination condition, then to terminate determination of correlation between said candidate sequence of symbol and said target sequence of symbol; and
  (ii) if said combined correlation value does not meet said early termination condition, then to permit continuation of determination of correlation between said candidate sequence of symbol and said target sequence of symbol.

At least some further example embodiments of the present disclosure provides correlation circuitry comprising:

selection means for selecting a sequence of symbol subsets comprising proper subsets of a candidate sequence of symbols and corresponding proper subsets of a target sequence of symbols;

correlation value determining means, coupled to said selection means, for determining for a given symbol subset of said sequence of symbol subsets comprising a given proper subset of said candidate sequence of symbols and a given proper subset of said target sequence of symbols a partial correlation value indicative of correlation between said given proper subset of said candidate sequence of symbols and said given proper subset of said target sequence of symbols;

correlation value combining means, coupled to said correlation value determining means, for generating a combined correlation value by combining said partial correlation value with one or more previously determined partial correlation values indicative of correlations between different proper subsets of said candidate sequence of symbols and corresponding different proper subsets of said target sequence of symbols; and early termination means, coupled to said correlation value combining means, for:
  (i) if said combined correlation value meets an early termination condition, then terminating determination of correlation between said candidate sequence of symbol and said target sequence of symbol; and
  (ii) if said combined correlation value does not meet said early termination condition, then permitting continuation of determination of correlation between said candidate sequence of symbol and said target sequence of symbol.

At least some further example embodiments of the present disclosure provide a method of determining a correlation comprising the steps of:

selecting a sequence of symbol subsets comprising proper subsets of a candidate sequence of symbols and corresponding proper subsets of a target sequence of symbols;

determining for a given symbol subset of said sequence of symbol subsets comprising a given proper subset of said candidate sequence of symbols and a given proper subset of said target sequence of symbols a partial correlation value indicative of correlation between said given proper subset of said candidate sequence of symbols and said given proper subset of said target sequence of symbols;

generating a combined correlation value by combining said partial correlation value with one or more previously determined partial correlation values indicative of correlations between different proper subsets of said candidate sequence of symbols and corresponding different proper subsets of said target sequence of symbols; and (i) if said combined correlation value meets an early termination condition, then terminating determination of correlation between said candidate sequence of symbol and said target sequence of symbol; and (ii) if said combined correlation value does not meet said early termination condition, then permitting continuation of determination of correlation between said candidate sequence of symbol and said target sequence of symbol.

BRIEF DESCRIPTION OF THE DRAWINGS

Example embodiments will now be described, by way of example only, with reference to the accompanying drawings in which.

DETAILED DESCRIPTION OF EXAMPLE EMBODIMENTS

The present disclosure recognises that determination of the correlation value between the full candidate sequence of symbols and the full target sequence of symbols consumes considerable energy and that in many cases a sufficiently accurate determination as to whether there is or is not a desired match between the candidate sequence of symbols and the target sequence of symbols may be made after a determination of correlation between a proper subset of the candidate sequence of symbols and a corresponding proper subset of the target sequence of symbols has been made. This realisation may be exploited to perform an early termination of the determination of the correlation between the candidate sequence of symbols and the target sequence of symbols in a manner which saves energy and does not introduce an unacceptable degree of inaccuracy into the correlation determination.

The correlation circuitry may, in at least some example embodiments, be able to cope with a signal-to-noise ratio of down to a certain level, but in practice may operate with signals considerably above this signal-to-noise ratio permitting an accurate determination of correlation to be made based upon a comparison of fewer symbols between the candidate sequence of symbols and the target sequence of symbols. The early termination mechanisms allow a trade off to be made between accuracy in the determination of the correlation against the power consumed. Once the correlation determination has reached a desired degree of accuracy (certainty), then energy can be saved by early termination of the correlation determination as higher degrees of accuracy are not sufficiently beneficial.

In some example embodiments, the correlation value combining circuitry may comprise an accumulator configured to accumulate the partial correlation value with the one or more previously determined correlation values. In this way, the results of the determination of correlation between the sequentially selected proper subsets of the sequences of symbols may be combined to generate a combined correlation value representing the correlation determined up to that point based upon all of the partial correlations which have so far been performed.

It will be appreciated that the early termination may be performed in either or both of two situations. The correlation determination may be terminated early if the partial correlation performed up to that point indicates a sufficient level of confidence that there is no match. As an alternative to the above, or in combination with the above, it is also possible that the correlation determination may be terminated early when the partial correlation value determined up to a point indicates a sufficient level of confidence that there is a match between the candidate sequence of symbols and the target sequence of symbols.

In some example embodiments the selection circuitry may serve to divide the candidate sequence of symbols and the target sequence of symbols into K symbol subsets, where K is an integer greater than one. The balance between the number of subsets to which the sequences are divided and the overhead of supporting a finer level of granularity in the determination of the partial correlations may be varied between different implementations by varying the value of K. Furthermore, not all subsets need to contain the same number of symbols, e.g. a large initial correlation may be performed (e.g. K=N/2) before resorting to small incremental blocks following this. This strategy may be useful to prevent significant sensitivity loss from use of a small initial correlation.

It is convenient that is some example embodiments when there are N target symbols and N candidate symbols, then K may be selected such that N is an integer multiple of K. Such a relationship tends to simplify the implementation.

In some example embodiments the selection circuitry may be configured to select the sequence of symbol subsets in accordance with a polyphase decimation of the candidate sequence of symbols and the target sequence of symbols. Such a selection may improve the signal-to-noise ratio performance.

In some example embodiments there may be provided threshold table circuitry to store a table of threshold values corresponding to respective early termination conditions after different numbers of partial correlations have been combined to form a combined correlation value. Varying the correlation for different numbers of partial correlations and storing these values within table circuitry provides an efficient implementation in at least some example embodiments.

In order to assist in reducing the number of false positives or the number of false negatives produced, the threshold values may be selected to have values biased to suppress early termination for a given level of the determined correlation after fewer partial correlation values have been combined relative to after a greater number of partial correlation values have been combined. Biasing the threshold values in this way trades a reduction in the advantages provided by early termination against the disadvantages, such as wasted energy and/or lack of responsiveness, which can result from false positives or false negatives.

In some embodiments, the threshold values may be adaptive threshold values which are varied during operation of the correlation circuitry so as to adjust the sensitivity of the correlation circuitry. Accordingly, the operation of the early termination mechanisms may be adaptively varied by varying the threshold values in a manner which allows the system to adopt a desired level of sensitivity as a response to the surrounding conditions and/or as selected by a user.

In some example embodiments, there may be provided a shift register for storing the candidate sequence of symbols and from which the selection circuitry may select the proper subsets of candidate sequences of symbols. This selection may be in accordance with a polyphase decimation as described earlier, or some other selection criteria.

In some example embodiments, the target sequence of symbols may be stored within a target sequence memory from which the selection circuitry may select the proper subsets of the target sequence of symbols for comparison with corresponding proper subsets of the candidate sequence of symbols.

It will be appreciated that the symbols which are compared may take a variety of different forms. In some example embodiments, these may be single bit signals. In other embodiments a more sophisticated and statistical comparison between symbols may be made when the symbols are multi-bit symbols.

The correlation circuitry described above may be used in a wide variety of different circumstances. In some example embodiments, the correlation circuitry includes receiver circuitry which serves to receive a signal (e.g. a radio signal) and to convert the signal so as to form the candidate sequence of symbols. In other embodiments the candidate sequence of symbols may be formed other than via receipt by radio receiver circuitry e.g. body-coupled communication.

Within some example embodiments the correlation may be used to control a wake-up signal generator which serves to generate a wake-up signal for triggering data processing apparatus to commence processing operations if the candidate sequence of signals and the target sequence of symbols have a correlation greater than a threshold level. Such a wake-up signal may, in some example embodiments, only be generated after completion of the determination for all the subsets has been performed as this will have the greatest accuracy and the penalty for a false positive determination may be high.

The present techniques may be used in some example embodiments including energy harvesting circuitry which serves to harness their energy from the environment as reducing power consumption within such systems is particularly important.

Figure 1:
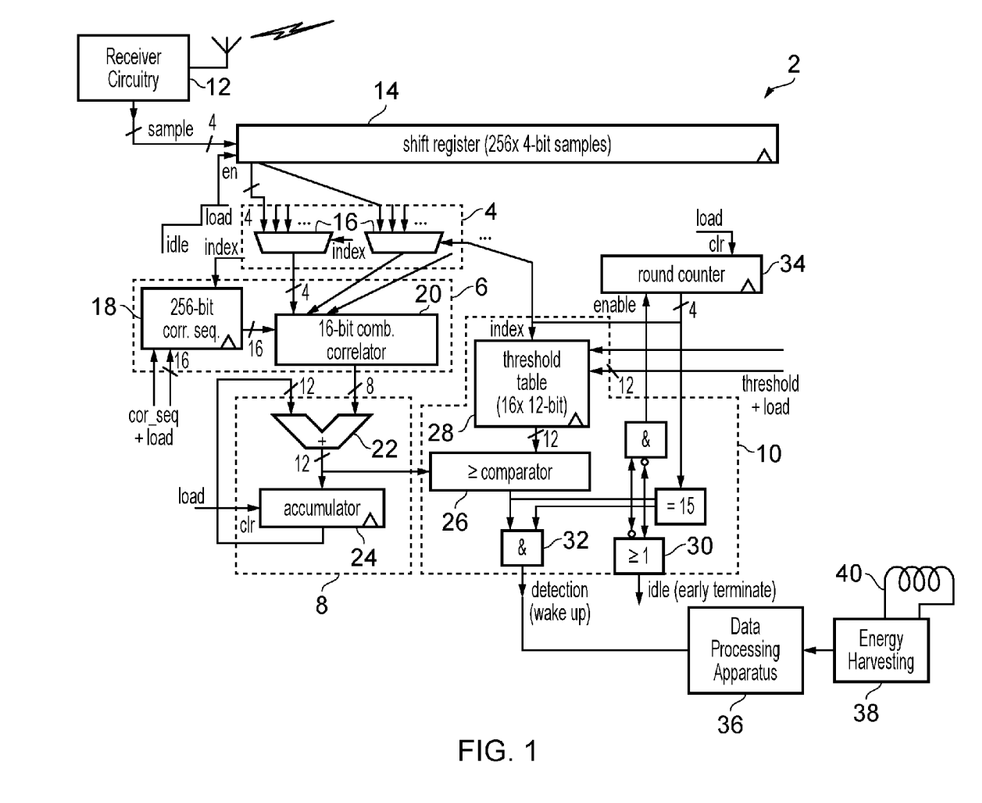
FIG. 1 schematically illustrates correlation circuitry for determining correlation between a candidate sequence of symbols and a target sequence of symbols.

FIG. 1 schematically illustrates correlation circuitry 2 including selection circuitry 4, correlation value determining circuitry 6, correlation value combining circuitry 8 and early termination circuitry 10. Receiver circuitry 12 receives radio signals and converts these into multi-bit symbols which are stored within a shift register 14. The multi-bit symbols stored within the shift register 14 comprise the candidate sequence of symbols. The selection circuitry 4 includes multiplexers 16 which select a sequence of proper subsets of the candidate sequence of symbols stored within the shift register 14. This selection may take the form of a polyphase decimation, but other forms of selection are also possible, e.g. selection of blocks of adjacent symbols stored within the shift register 14.

The selected proper subsets of the candidate sequence of symbols are supplied to the correlation value determining circuitry 6 which includes a target sequence memory 18 storing the target sequence of symbols against which a correlation is made. An index value which controls which of the proper subset of symbols from the candidate sequence of symbols is selected via the multiplexers 16 is also supplied to the target sequence memory 18 and serves to select a corresponding proper subset of the target sequence of symbols against which the correlation is being made. It will be appreciated that if a polyphase decimation is being performed among the candidate sequence of symbols, then a corresponding polyphase decimation will be performed among the target sequence of symbols when the selection is made from this target sequence of symbols. The correlation value determining circuitry 6 includes a 16-bit combination correlator 20 which generates a partial correlation value indicative of a correlation between a given (currently selected) proper subset of the candidate sequence of symbols and corresponding given (currently selected) proper subset of the target sequence of symbols.

The correlation value combining circuitry 8 receives the partial correlation value generated by the correlation value determining circuitry 6 and adds this using an adder 22 to one or more previously determined partial correlation values whose sum has been accumulated within an accumulator register 24. The output from the adder 22 is stored into the accumulator register 24 to generate an undated value of the combined correlation value.

The early termination circuitry 10 includes a comparator 26 and threshold table circuitry 28. The index value which indicates how many partial correlation determinations have been performed at a given point in time also serves to select a threshold value from the threshold table circuitry 18 and supply this as one input to the comparator 26. The other input to the comparator 26 is the current value of the combined correlation value. If the combined correlation value at a given point is less than the threshold value for that given point (i.e. an early termination condition is met), then this indicates a sufficient degree of confidence that no match is present between the full candidate sequence of symbols and the full target sequence of symbols that an early termination may be performed. The circuit block 30 generates such an early termination signal if this condition is detected. If this condition is not detected, then further partial correlations are performed until finally all of the proper subsets have been compared, at which time a wakeup signal is generated by the AND gate 32. A wrapping counter 34 serves to generate the index value used at any given point of time to control which partial subset of the sequences of symbols are being compared and which threshold value is being used. The threshold values with the threshold table circuitry 28 may be adaptive, e.g. feedback or other (e.g. user selected) mechanisms may be provided to alter the threshold values to change the sensitivity of the detection.

The wakeup signal may be supplied to a data processing apparatus 36 to trigger that data processing apparatus to commence data processing operations (which may be energy intensive and only triggered when a wake-up sequence of symbols has been detected). The data processing apparatus may be powered with energy harvesting circuitry 38 which operates to harvest energy from the environment of the system, such as via a coil 40 for drawing power from received electro-magnetic waves.

Figure 2:
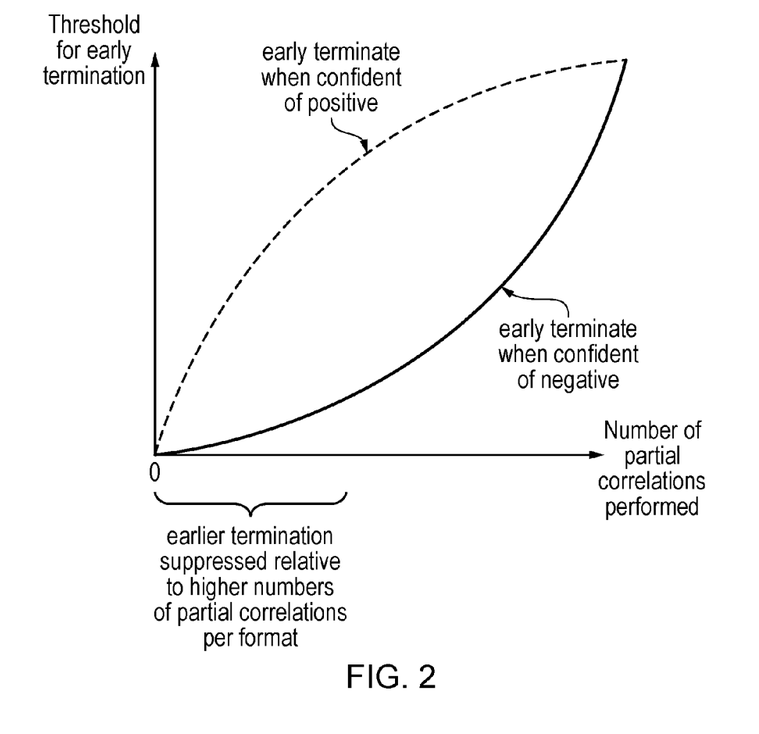
FIG. 2 is a graph schematically illustrating variation in thresholds used for early termination with the number of partial correlations performed.

FIG. 2 schematically illustrates how the threshold values stored within the threshold table circuitry 28 vary for different index values corresponding to the number of partial correlations performed up to a given point. These threshold values do not climb linearly and can be used to bias the system such that early termination is suppressed for a given level of determined correlation after fewer partial correlations have been combined relative to after a greater number of partial correlation values have been combined. Such a biasing serves to suppress both false negatives and false positives. It will be appreciated that the present techniques may be used to early terminate when a sufficient degree of confidence that a negative (i.e. no correlation) has been identified. The present techniques may also be used, either separately or in combination with this, to early terminate when the combined correlation value determined up to a given point gives a sufficient degree of confidence that a positive (match) has been detected.

Figure 3:
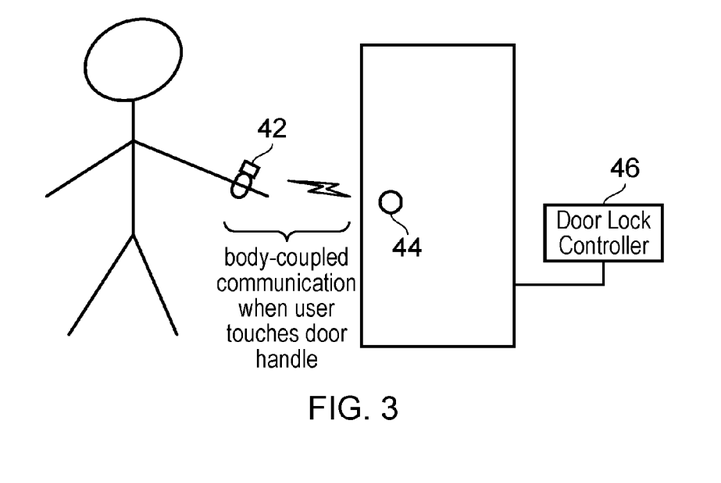
FIG. 3 schematically illustrates a system employing body-coupled communications.

FIG. 3 schematically illustrates a system using body-coupled communication. In this example a user wears a smart watch 42 which includes correlation circuitry as previously described. When the user touches a door handle 44, then body-coupled communications between the smart watch 42 and a door lock controller 46 are established. The door lock controller 46 may continuously transmit the target sequence of symbols and when this is detected via the correlation circuitry within the smart watch 42 it may wake up the mechanisms within the smart watch 42 which then serve to attempt to authenticate the user against the door lock controller 46 to determine whether or not the user is able to open the door. It will be appreciated that this application of the correlation circuitry described above is only one example use of this correlation circuitry. The correlation circuitry provides more energy efficient operation and such a characteristic is desirable in a wide variety of situations.

Figure 4:
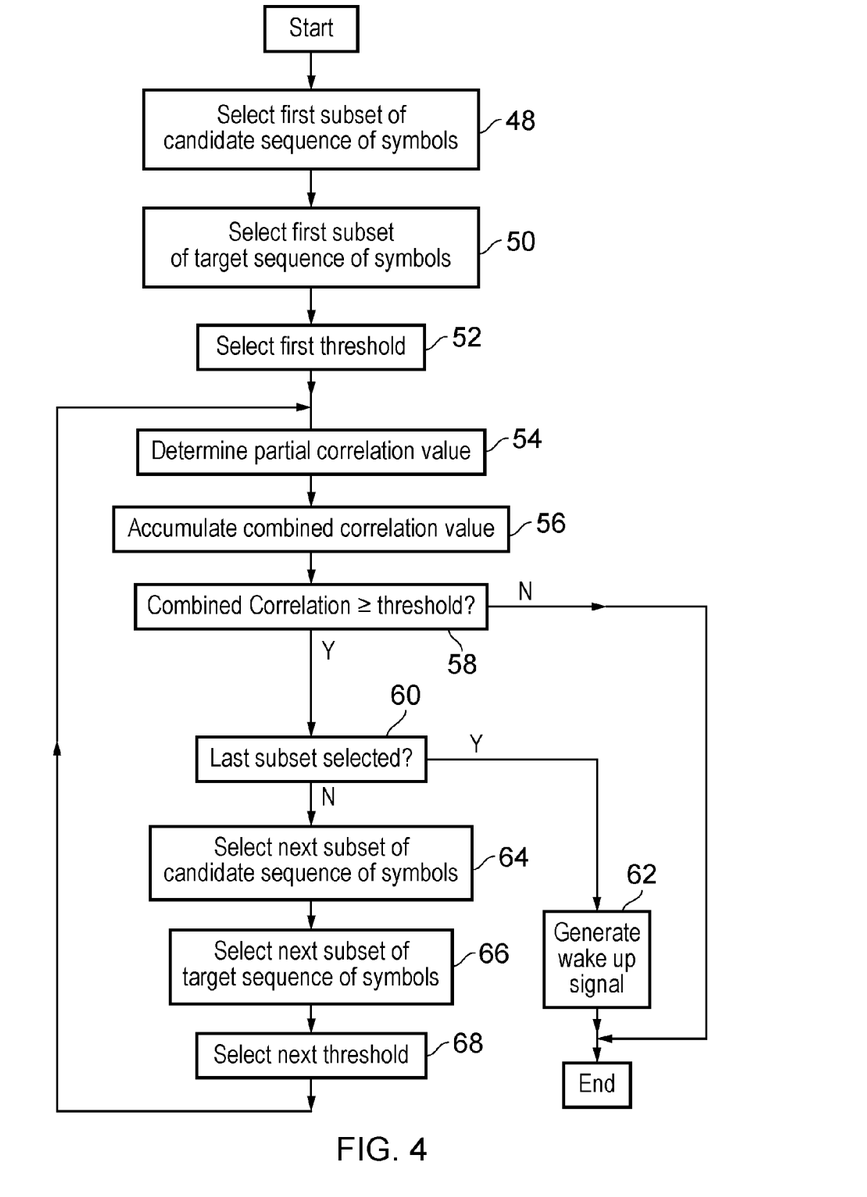
FIG. 4 is a flow diagram schematically illustrating the operation of the correlation circuitry of FIG. 1.

FIG. 4 is a flow diagram schematically illustrating the operation of the circuitry of FIG. 1. At step 38 a first proper subset of the candidate sequence of symbols is selected. At step 50 a first proper subset of the target sequence of symbols is selected. At step 52 a first threshold value is selected. At step 54 the partial correlation value is determined for the currently selected proper subset of the candidate sequence of symbols and the currently selected proper subset of the target sequence of symbols. At step 56 this partial correlation value is accumulated into the one or more previously determined partial correlation values to form a combined correlation value. At step 58 the combined correlation value is compared with the currently selected threshold value. If the combined correlation value does not exceed the currently selected threshold value, then early termination of the process results.

If the determination at step 58 is that the current combined correlation value does exceed the current threshold value, then early termination is not performed and processing proceeds to step 60 where a determination is made as to whether or not the last proper subset is currently selected. If the last proper subset is currently selected (and the combined correlation already exceeded the threshold value at step 58), then this indicates that a positive correlation has been detected and processing proceeds to step 62 at which a wakeup signal is generated and supplied to the attached data processing apparatus 36.

If the determination at step 60 is that the last proper subset is not currently selected, then processing proceeds via steps 64, 66 and 68 back to step 54. Steps 64, 66 and 68 respectively select a next proper subset of the candidate sequence of symbols, a next proper subset of the target sequence of symbols and a next threshold value appropriate to the selected subsets.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Correlation circuitry comprising:
   selection circuitry configured to select a sequence of symbol subsets comprising proper subsets of a candidate sequence of symbols and corresponding proper subsets of a target sequence of symbols;
   correlation value determining circuitry coupled to said selection circuitry and configured to determine for a given symbol subset of said sequence of symbol subsets comprising a given proper subset of said candidate sequence of symbols and a given proper subset of said target sequence of symbols a partial correlation value indicative of correlation between said given proper subset of said candidate sequence of symbols and said given proper subset of said target sequence of symbols;
   correlation value combining circuitry coupled to said correlation value determining circuitry and configured to generate a combined correlation value by combining said partial correlation value with one or more previously determined partial correlation values indicative of correlations between different proper subsets of said candidate sequence of symbols and corresponding different proper subsets of said target sequence of symbols; and
   early termination circuitry coupled to said correlation value combining circuitry and configured:
   (i) if said combined correlation value meets an early termination condition, then to terminate determination of correlation between said candidate sequence of symbol and said target sequence of symbol; and
   (ii) if said combined correlation value does not meet said early termination condition, then to permit continuation of determination of correlation between said candidate sequence of symbol and said target sequence of symbol.

2. Correlation circuitry as claimed in claim 1, wherein said correlation value combining circuitry comprises an accumulator configured to accumulate said partial correlation value with said one or more previously determined partial correlation values.

3. Correlation circuitry as claimed in claim 1, wherein said early termination condition is that said combined correlation value indicates less than a threshold level of correlation between said candidate sequence of symbols and said target sequence of symbols and said termination of said determination is accompanied by generation of result that said candidate sequence of symbols does not match said target sequence of symbols.

4. Correlation circuitry as claimed in claim 1, wherein said early termination condition is that said combined correlation value indicates more than a threshold level of correlation between said candidate sequence of symbols and said target sequence of symbols and said termination of said determination is accompanied by generation of result that said candidate sequence of symbols matches said target sequence of symbols.

5. Correlation circuitry as claimed in claim 1, wherein said selection circuitry divides said candidate sequence of symbols and said target sequence of symbols into K symbol subsets, where K is an integer greater than one.

6. Correlation circuitry as claimed in claim 5, wherein said candidate sequence of symbols comprises N candidate symbols, said target sequence of symbols comprises N target symbols, where N is an integer multiple of K, and each of said K symbols subsets contains N/K candidate symbols and N/K target symbols.

7. Correlation circuitry as claimed in claim 1, wherein said selection circuitry is configured to select said sequence of symbol subsets in accordance with a polyphase decimation of said candidate sequence of symbols and said target sequence of symbols.

8. Correlation circuitry as claimed in claim 1, comprising threshold table circuitry configured to store a table of threshold values corresponding to respective early termination conditions after different numbers of partial correlation values have been combined to form said combined correlation value.

9. Correlation circuitry as claimed in claim 8, wherein said table of threshold values have values biased to suppress early termination for a given level of determined correlation after fewer partial correlation values have been combined relative to after a greater number of partial correlation values have been combined.

10. Correlation circuitry as claimed in claim 8, wherein said early termination circuitry comprises a comparator configured to compare said combined correlation values with a threshold value selected from said table of threshold values in dependence upon a current number of partial correlation values combined to form said combined correlation value.

11. Correlation circuitry as claimed in claim 8, wherein said threshold values are adaptive threshold values varied so as to adjust sensitivity of said correlation circuitry.

12. Correlation circuitry as claimed in claim 1, comprising a shift register configured to store said candidate sequence of symbols and wherein said selection circuitry is coupled to said shift register to select said proper subsets of said candidate sequence of symbols.

13. Correlation circuitry as claimed in claim 1, comprising a target sequence memory configured to store said target sequence of symbols and wherein said selection circuitry is coupled to said target sequence memory to select said proper subsets of said target sequence of symbols.

14. Correlation circuitry as claimed in claim 1, wherein said candidate sequence of symbols comprises a candidate sequence of multibit symbols and said target sequence of symbols comprises a target sequence of multibit symbols.

15. Correlation circuitry as claimed in claim 1, comprising receiver circuitry configure to receive a signal and to convert said signal to form said candidate sequence of symbols.

16. Correlation circuitry as claimed in claim 1, comprising a wake-up signal generator configured to generate a wake up signal for triggering an data processing apparatus to commence data processing operations if a correlation between said candidate sequence of symbols and said target sequence of symbols is greater than a threshold level.

17. Correlation circuitry as claimed in claim 16, wherein said wake-up signal generator is configured to generate said wake up signal after partial correlation values for all of said sequence of subsets have been determined by said correlation value determining value circuitry and combined by said correlation value combining circuitry.

18. A body-coupled communications apparatus comprising correlation circuitry comprising:
selection circuitry configured to select a sequence of symbol subsets comprising proper subsets of a candidate sequence of symbols and corresponding proper subsets of a target sequence of symbols;
correlation value determining circuitry coupled to said selection circuitry and configured to determine for a given symbol subset of said sequence of symbol subsets comprising a given proper subset of said candidate sequence of symbols and a given proper subset of said target sequence of symbols a partial correlation value indicative of correlation between said given proper subset of said candidate sequence of symbols and said given proper subset of said target sequence of symbols;
correlation value combining circuitry coupled to said correlation value determining circuitry and configured to generate a combined correlation value by combining said partial correlation value with one or more previously determined partial correlation values indicative of correlations between different proper subsets of said candidate sequence of symbols and corresponding different proper subsets of said target sequence of symbols; and
early termination circuitry coupled to said correlation value combining circuitry and configured:
(i) if said combined correlation value meets an early termination condition, then to terminate determination of correlation between said candidate sequence of symbol and said target sequence of symbol; and
(ii) if said combined correlation value does not meet said early termination condition, then to permit continuation of determination of correlation between said candidate sequence of symbol and said target sequence of symbol.

19. Apparatus for processing data comprising:
energy harvesting circuitry for harvesting energy to operate said apparatus from an environment of said apparatus; and
correlation circuitry comprising:
selection circuitry configured to select a sequence of symbol subsets comprising proper subsets of a candidate sequence of symbols and corresponding proper subsets of a target sequence of symbols;
correlation value determining circuitry coupled to said selection circuitry and configured to determine for a given symbol subset of said sequence of symbol subsets comprising a given proper subset of said candidate sequence of symbols and a given proper subset of said target sequence of symbols a partial correlation value indicative of correlation between said given proper subset of said candidate sequence of symbols and said given proper subset of said target sequence of symbols;
correlation value combining circuitry coupled to said correlation value determining circuitry and configured to generate a combined correlation value by combining said partial correlation value with one or more previously determined partial correlation values indicative of correlations between different proper subsets of said candidate sequence of symbols and corresponding different proper subsets of said target sequence of symbols; and
early termination circuitry coupled to said correlation value combining circuitry and configured:
(i) if said combined correlation value meets an early termination condition, then to terminate determination of correlation between said candidate sequence of symbol and said target sequence of symbol; and
(ii) if said combined correlation value does not meet said early termination condition, then to permit continuation of determination of correlation between said candidate sequence of symbol and said target sequence of symbol.

20. Correlation circuitry comprising:
selection means for selecting a sequence of symbol subsets comprising proper subsets of a candidate sequence of symbols and corresponding proper subsets of a target sequence of symbols;
correlation value determining means, coupled to said selection means, for determining for a given symbol subset of said sequence of symbol subsets comprising a given proper subset of said candidate sequence of symbols and a given proper subset of said target sequence of symbols a partial correlation value indicative of correlation between said given proper subset of said candidate sequence of symbols and said given proper subset of said target sequence of symbols;
correlation value combining means, coupled to said correlation value determining means, for generating a combined correlation value by combining said partial correlation value with one or more previously determined partial correlation values indicative of correlations between different proper subsets of said candidate sequence of symbols and corresponding different proper subsets of said target sequence of symbols; and
early termination means, coupled to said correlation value combining means, for:
  (i) if said combined correlation value meets an early termination condition, then terminating determination of correlation between said candidate sequence of symbol and said target sequence of symbol; and
  (ii) if said combined correlation value does not meet said early termination condition, then permitting continuation of determination of correlation between said candidate sequence of symbol and said target sequence of symbol.

21. A method of determining a correlation comprising the steps of:
selecting a sequence of symbol subsets comprising proper subsets of a candidate sequence of symbols and corresponding proper subsets of a target sequence of symbols;
determining for a given symbol subset of said sequence of symbol subsets comprising a given proper subset of said candidate sequence of symbols and a given proper subset of said target sequence of symbols a partial correlation value indicative of correlation between said given proper subset of said candidate sequence of symbols and said given proper subset of said target sequence of symbols;
generating a combined correlation value by combining said partial correlation value with one or more previously determined partial correlation values indicative of correlations between different proper subsets of said candidate sequence of symbols and corresponding different proper subsets of said target sequence of symbols; and
  (i) if said combined correlation value meets an early termination condition, then terminating determination of correlation between said candidate sequence of symbol and said target sequence of symbol; and
  (ii) if said combined correlation value does not meet said early termination condition, then permitting continuation of determination of correlation between said candidate sequence of symbol and said target sequence of symbol.

* * * * *